(12) United States Patent
Lavallee et al.

(10) Patent No.: US 11,288,607 B2
(45) Date of Patent: Mar. 29, 2022

(54) AUTOMATED RESOURCE MANAGEMENT SYSTEM AND METHOD

(71) Applicant: MERINIO INC., Montreal (CA)

(72) Inventors: Xavier Lavallee, Montreal (CA); Maxime Gauthier Bourbonnais, Montreal (CA); Francis Villiard, Laval (CA); Jean-Michel Coupal, Montreal (CA)

(73) Assignee: MERINIO INC., Montreal (CA)

( * ) Notice: Subject to any disclaimer, the term of this patent is extended or adjusted under 35 U.S.C. 154(b) by 181 days.

(21) Appl. No.: 16/515,559

(22) Filed: Jul. 18, 2019

(65) Prior Publication Data

US 2020/0151652 A1     May 14, 2020

Related U.S. Application Data

(60) Provisional application No. 62/700,051, filed on Jul. 18, 2018.

(51) Int. Cl.
*G06Q 10/00* (2012.01)
*G06Q 10/06* (2012.01)
*G06Q 10/10* (2012.01)

(52) U.S. Cl.
CPC ........ *G06Q 10/063118* (2013.01); *G06Q 10/06312* (2013.01); *G06Q 10/063112* (2013.01); *G06Q 10/107* (2013.01); *G06Q 10/103* (2013.01)

(58) Field of Classification Search
None
See application file for complete search history.

(56) References Cited

U.S. PATENT DOCUMENTS

| | | | | |
|---|---|---|---|---|
| 7,437,309 B2* | 10/2008 | Magrino | ............... | G06Q 10/06 705/7.14 |
| 7,555,441 B2* | 6/2009 | Crow | ............... | G06Q 10/0631 705/7.14 |
| 7,778,938 B2* | 8/2010 | Stimac | ............... | G06Q 10/10 705/321 |
| 7,848,947 B1* | 12/2010 | McGloin | ............... | G06Q 10/10 705/7.42 |
| 8,073,731 B1* | 12/2011 | Rajasenan | ............ | G06Q 10/0637 705/7.42 |
| 8,407,081 B1* | 3/2013 | Rajasenan | ............ | G06Q 10/0639 705/7.42 |

(Continued)

OTHER PUBLICATIONS

Toporkov, Victor, et al. "Composite scheduling strategies in distributed computing with non-dedicated resources." Procedia Computer Science 9 (2012): 176-185. (Year: 2012).*

(Continued)

*Primary Examiner* — Gurkanwaljit Singh
(74) *Attorney, Agent, or Firm* — BCF LLP

(57) ABSTRACT

The present technology generally relates to a system and to a method automated resource management. The method comprises obtaining a sorted list of employees based on vacancies to be filled; wherein each vacancy of the vacancies to be filled comprises a timeslot and a responsibility. The method comprises contacting employees in the sorted list and proposing available timeslots and responsibilities; receiving timeslot and responsibility preferences of the contacted employees; and resorting list of employees based on received timeslots and responsibilities preferences.

12 Claims, 14 Drawing Sheets

(56) References Cited

U.S. PATENT DOCUMENTS

| | | | | |
|---|---|---|---|---|
| 8,554,597 | B2* | 10/2013 | Allpress | G06Q 10/06398 705/7.12 |
| 9,405,799 | B1* | 8/2016 | Kapoor | G06Q 10/1053 |
| 10,592,830 | B2* | 3/2020 | Gupta | G06Q 10/063112 |
| 2002/0055866 | A1* | 5/2002 | Dewar | G06Q 10/0639 705/7.38 |
| 2003/0195786 | A1* | 10/2003 | Dewar | G09B 7/02 705/7.14 |
| 2003/0229529 | A1* | 12/2003 | Mui | G06Q 50/2057 705/328 |
| 2004/0115596 | A1* | 6/2004 | Snyder | G09B 7/02 434/118 |
| 2005/0137925 | A1* | 6/2005 | Lakritz | G06Q 10/06312 705/7.22 |
| 2005/0246299 | A1* | 11/2005 | Scarborough | G06Q 10/10 706/21 |
| 2007/0022113 | A1* | 1/2007 | Heino | G06Q 30/00 |
| 2009/0248553 | A1* | 10/2009 | Taylor | G06Q 10/1091 705/32 |
| 2011/0022530 | A1* | 1/2011 | Bogle | G06Q 10/1053 705/321 |
| 2013/0090969 | A1* | 4/2013 | Rivere | G06Q 10/06 705/7.19 |
| 2014/0079207 | A1* | 3/2014 | Zhakov | H04M 3/5175 379/265.03 |
| 2014/0122143 | A1* | 5/2014 | Fletcher | G06Q 10/0631 705/7.14 |
| 2016/0110822 | A1* | 4/2016 | Shaaban | G06F 17/40 705/32 |
| 2017/0236081 | A1* | 8/2017 | Grady Smith | G06Q 10/067 705/7.36 |
| 2020/0090107 | A1* | 3/2020 | McKeeman | G06Q 10/06393 |

OTHER PUBLICATIONS

Krzysztof, Kurowski, et al. "Scheduling jobs on the grid-multicriteria approach." CMST 12.2 (2006): 123-138. (Year: 2006).*

Röblitz, T., F. Schintke, and A. Reinefeld. "Resource reservations with fuzzy requests." Concurrency and Computation: Practice & Experience 18.13 (2006): 1681-1703. (Year: 2006).*

Fiandrino, Claudio, et al. "Sociability-driven framework for data acquisition in mobile crowdsensing over fog computing platforms for smart cities." IEEE Transactions on Sustainable Computing 2.4 (2017): 345-358. (Year: 2017).*

* cited by examiner

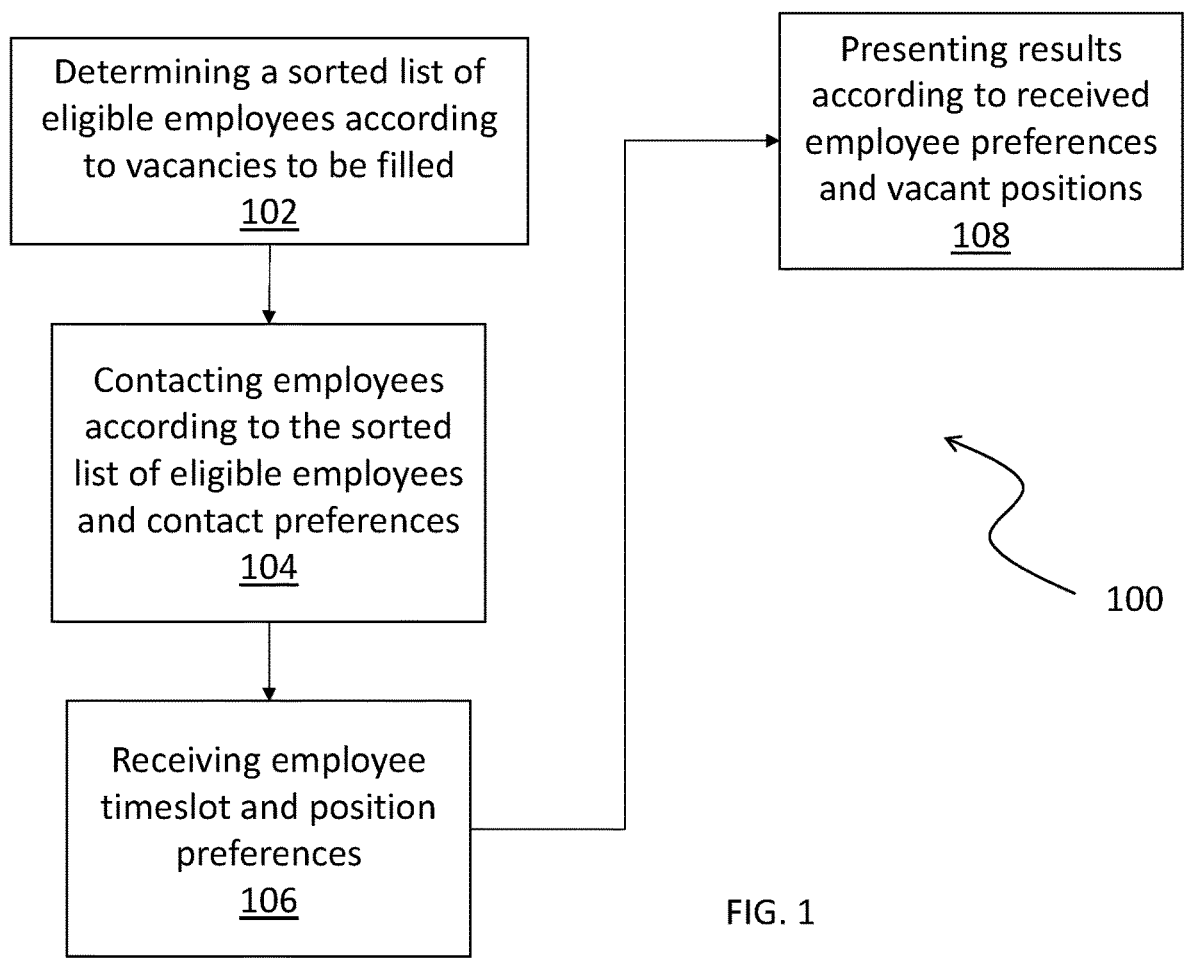

|  | Shift 1 | Shift 2 | Shift 3 |
|---|---|---|---|
| Receptionist 1 | ● | ○ | ○ |
| Ticketing 1 | ● | ● | ⊗ |
| Ticketing 2 | ○ | ● | ● |
| Rental 1 | ● | ⊗ | ○ |
| Rental 2 | ● | ● | ● |
| Lift attendant1 | ○ | ○ | ⊗ |
| Lift attendant2 | ○ | ● | ○ |
| Lift attendant3 | ● | ● | ○ |
| Supervisor 1 | ● | ○ | ● |

● Fullfilled
○ Vacant
⊗ Not required

| Employee ID | Employee | Contact Preferences | Qualifications | Timeslot Preferences | Priority |
|---|---|---|---|---|---|
| 2343 | Annie | phone | Ticketing and Rental | Shift 1 and Shift 2 | 1 |
| 3425 | Beatrice | email | Reception and Rental | Shift 1 and Shift 2 | 2 |
| 8734 | Carmen | sms | Lift | Shift 2 and Shift 3 | 3 |
| 6723 | Dereck | email | Supervisor and Lift | Shift 3 | 4 |
| 8921 | Eric | phone | Reception and Rental | Shift 2 and Shift 3 | 5 |
| 3729 | Fred | push | Ticketing and Rental | Shift 3 | 6 |
| 6356 | Garry | sms | Reception | Shift 3 | 7 |
| 6427 | Hector | email | Supervisor and Lift | Shift 1 and Shift 2 | 8 |
| 5639 | Iago | push | Ticketing and Rental | Shift 1 and Shift 3 | 9 |
| 5738 | Julie | email | Rental and Reception | Shift 2 and Shift 3 | 10 |

FIG. 2C   220

No
answer

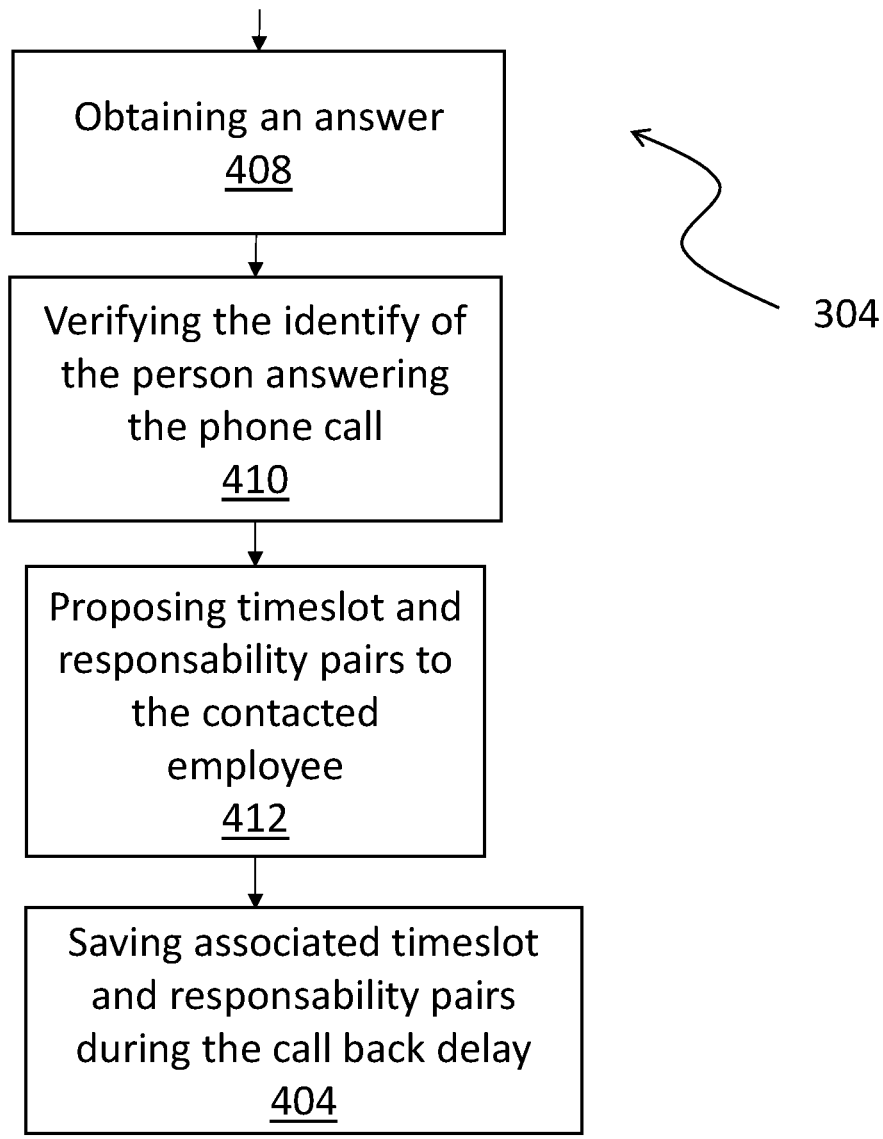

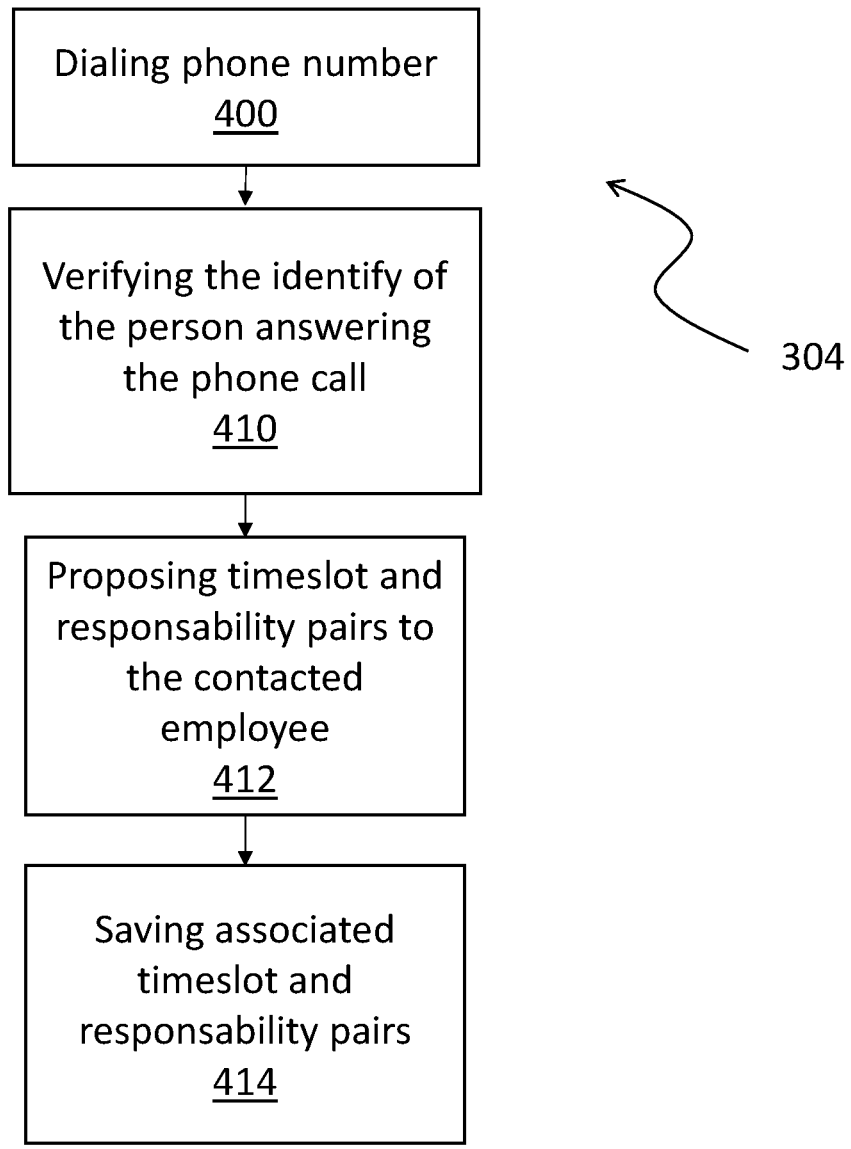

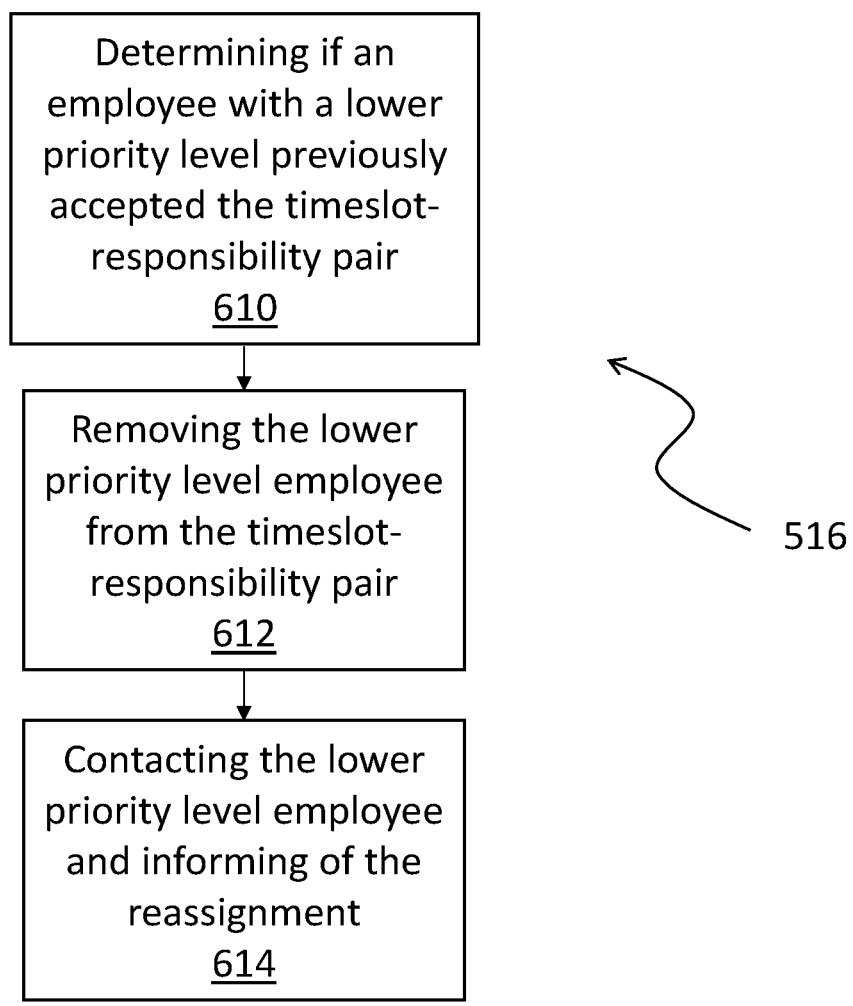

AUTOMATED RESOURCE MANAGEMENT SYSTEM AND METHOD

CROSS-REFERENCE TO RELATED APPLICATION

The present application claims priority to and benefit from U.S. Provisional Patent Application 62/700,051, filed on Jul. 18, 2018, the disclosure of which is incorporated by reference in its entirety.

TECHNICAL FIELD

The present technology generally relates to the field of resource management, and more specifically to the field of automated resource management.

BACKGROUND INFORMATION

In most industries, work shift assignment or the decision making process of work shift assignment is an arduous and complex process that is time consuming. In some industries work shift assignment can require hundreds or even thousands of hours per year. In many cases, work shifts must be assigned to competent and available employees according to a set of predetermined rules and requirements. This assignment process can be inefficient and time-consuming especially when last minute changes are required. Such last minute changes can indeed be a cause of frustration on the part of employees, management and scheduling managers as well. Moreover, scheduling managers must take into consideration various workforce and union regulations, satisfying those regulations can be very complex and in certain cases impossible to manage.

The consequences of lacking personnel can be disastrous, especially in production facilities, where a missing employee can be the cause of lost profits due to a slow down or a full stop of the production line. In industries where weather dictates performance, such as with theme parks or with ski hills, being able to postpone the assignment of employees and increase the amount of on-call employees can be beneficial especially when there are less than ideal meteorological conditions. Therefore, companies in these climate-affected industries require several scheduling managers to call employees at the last minute in order to meet demand and yet limit overstaffing which would cause unnecessary reduction in profits. Moreover, in industries that have a strong union presence, scheduling managers must take into consideration complex union rules dictating when to call employees and which employees to call when fulfilling vacant positions in the schedule. These rules can span from the priority of employees in the calling order, based on number of hours worked, seniority, type of position in the company all the way to the number of minutes between calls depending on time of day. Breaking any of these rules, even by accident, can result in costly grievances paid out directly to the concerned employees. For example, if a tired manager on Christmas Eve calls in the wrong employee and skips several employees with a higher priority, all of those employees would be entitled to pay at a very attractive holiday rate that can often represent two to four times the normal pay rate, costing the company thousands of dollars for a single mistake. Compounding the stress of fulfilling a position the right way and dealing with a potential production line halt this work shift assignment process can be error-prone and inefficient.

Computer systems have been developed to facilitate shift fulfillment in multiple fields, such as in the educational field, firefighting field and call center field. Most of the existing solutions are cloud based SaaS sold by vendors such as Vocantas Inc., CrewSense as well as on-premises solutions sold as customized software for various industries such as healthcare and utilities. These automated systems require a database of eligible employees and often Absence or Vacation information in order to provide a relevant list of employees to contact. Some systems are capable of automating the employee contacting process. The system automatically informs employees when there is a vacancy that they are eligible for and transmits employee availability answers to a centralized database. The database of eligible employees is thereby routinely updated. The database updating routine can be greatly solicited in environments with a large number of replacements and can produce discrepancies with respect to priority and delay rules.

In U.S. Pat. No. 8,965,779 to Noble Jr. et al., incorporated herein by reference, there is disclosed a fulfilling staffing requirements using an interactive voice response (IVR) method and system. The system forecasts staffing requirements for a business activity and a portion of the staffing fulfillment requirements are identified using the IVR. Eligible staff members that may fulfill the requirements are identified and a first member of the eligible staff member is contacted. The first member is then requested to fulfill a staff member position by the IVR and if the member accepts fulfilling the staff member position, an acceptance is sent from the IVR and the first member is scheduled based on his acceptance to fulfill the staff member position.

In United States Patent Publication No. 2002/0103691 to Smith, incorporated herein by reference, there is described a software system for automated scheduling of temporary medical professionals. The system uses a database of available staffers and hospital users. A hospital user may place an order into the system on short notice for a particular assignment at a particular shift and the system sorts through the database to identify matching staffers and prioritizes them. The staffers are then automatically notified electronically by methods such as telephone, email, and pager based on their priority until a staffer accepts the assignment, at which time the notification process ceases and further acceptance is locked out. The hospital user is notified electronically of the identity of the accepting staffer. Potential staffers are contacted nearly simultaneously, saving the employer time and providing the staffers with equal opportunity to accept.

In U.S. Pat. No. 6,675,151 to Thompson et al., incorporated herein by reference, there is described a system and method for automating substitute fulfillment to assign a replacement worker. The replacement worker being asked to substitute for a worker during a temporary absence. The method and system also perform placement of floating workers, tracking absences and entitlements of workers, notifying interested parties regarding unexpected events and daily announcements, and bidding for temporary workers. Substitute fulfillment, contact, absence, entitlement and notification data is stored centrally in a database on a server at a common site for multiple organizations employing the substitute fulfillment or notification system. When a worker absence is indicated, the system searches the database to obtain a list of potential replacements for the absent worker and tracks the worker's absences and entitlements. The system contacts potential replacements until one is found or until the list is exhausted. The system generates suitable reports and notifies organization personnel of any activity. The system also records announcements regarding unexpected or current events and contacts the interested parties of an organization with these announcements. The system stores and aggregates historical operation data prepares reports and provides relevant services.

In United States Patent Publication No. 2005/0055256 to Scott, incorporated herein by reference, there is described a method and system for filling vacancies. It may be used for finding replacements during staff shortages, or for filling entire rosters. It may also be used to fill casually occurring service needs, such as the need-for a child minding placement. The method involves entering availability details into a candidate data store, and entering vacancy details into a vacancy data store. Each vacancy is automatic crossmatched to availability details to create a list of available candidates for each vacancy. The list for each vacancy is automatically ordered, thus ranking the candidates according to predetermined criteria. The vacancies are then filled with the top ranking available candidate. This may be performed automatically or involve the transmission of invitations and acceptances. The invitations may be automatically dispatched, and the responses may automatically update the data. It may be layered to integrate the filling of a vacancy with the provision of a service for a related period of time. For instance, integrating the filling of a teaching or nursing staff vacancy with the provision of child minding services for the same period.

In United States Patent Publication No. 2008/0021752 to Shauer, incorporated herein by reference, there is described a computerized, network based, email and mobile phone messaging based work shift resolution system and method. The system includes a server, a web interface, a mobile messaging and email messaging interface and a database that stores employee information. The web interface is available to managers allowing them to enter shift details and send an email and mobile messaging blast to qualified employees. Each employee who receives an available shift notification is able to claim the shift by either composing a reply message using their mobile messaging device or by visiting a web link from their email device. The first employee to claim the shift is notified that their claim is successful, and subsequent employees who try to claim the shift will be notified either via mobile messaging or via a notification message in their web browser. Managers are able to see if a shift has been claimed and by whom, and may be notified via a mobile message when the shift is filled.

Although the above-mentioned references describe methods and systems for automated vacancy fulfillment, none of the identified references allow reassigning a vacancy to a resource or employee having a greater priority level.

Therefore, the need for a dynamic system reacting in real-time to any changes without human intervention arises, eliminating the majority of administrative work required to perform shift assignment. A truly automated workflow for identifying and contacting eligible employees for a series of available shifts would be of great use to any organisation that requires flexibility in scheduling and utilizes on-call employees to reduce overstaffing and unnecessary payroll costs.

SUMMARY OF TECHNOLOGY

According to various aspects, the present technology relates to a method for managing resources, the method comprising: obtaining at least one position selection to be filled by at least one person; the position selection having at least one eligibility criterion; wherein the position selection comprises a task and a plurality of timeslots for carrying out the task; for the position selection, determining a set of eligible persons from a set of potentially eligible persons based on the at least one eligibility criterion, each of the potentially eligible person having associated eligibility parameters; and ranking the set of eligible persons based on determined ranking parameters from a highest ranking to a lowest ranking; notifying the persons from the set of eligible persons of the position selection; receiving an indication from the notified persons, the indication being an indication of acceptance or no acceptance of the position selection; for the persons who have accepted the position selection, attributing the position selection to the person with the highest ranking; and based on the attribution of the position selection, re-ranking the eligible persons in the set of potentially eligible persons.

A system for automated resource management, the system comprising: a computer system having a processor arranges to execute a method, the method comprising: obtaining at least one position selection to be filled by at least one person; the position selection having at least one eligibility criterion; wherein the position selection comprises a task and a plurality of timeslots for carrying out the task; for the position selection, determining a set of eligible persons from a set of potentially eligible persons based on the at least one eligibility criterion, each of the potentially eligible person having associated eligibility parameters; and ranking the set of eligible persons based on determined ranking parameters from a highest ranking to a lowest ranking; notifying the persons from the set of eligible persons of the position selection; receiving an indication from the notified persons, the indication being an indication of acceptance or no acceptance of the position selection; for the persons who have accepted the position selection, attributing the position selection to the person with the highest ranking; and based on the attribution of the position selection, re-ranking the eligible persons in the set of potentially eligible persons.

An automated resource management method, comprising: obtaining a sorted list of employees based on vacancies to be filled; wherein each vacancy of the vacancies to be filled comprises a timeslot and a responsibility; contacting employees in the sorted list and proposing available timeslots and responsibilities; receiving timeslot and responsibility preferences of the contacted employees; and resorting list of employees based on received timeslots and responsibilities preferences.

A system for automated resource management, the system comprising: a computer system having a processor arranges to execute a method, the method comprising: obtaining a sorted list of resources according to vacancies to be filled; contacting resources according to the sorted list and proposing available timeslots and responsibilities; receiving resources' timeslot and position preferences; and presenting results according to received resources' timeslot preferences and vacant positions.

BRIEF DESCRIPTION OF THE DRAWINGS

Further features and advantages of the present invention will become apparent from the following detailed description, taken in combination with the appended drawings, in which:

FIG. 1 presents a block diagram describing a method to fulfill a vacancy, according to one embodiment;

FIG. 2B presents an example of a shift-position table for which some shift-positions require to be fulfilled, according to one embodiment;

FIG. 2C presents an example of an employee table having a list of employees and various associated employee criteria, according to one embodiment;

FIG. 4B presents a block diagram describing the contacting of an employee by phone, when there is an answer but not by the employee, according to the method presented in FIG. 3A, according to one embodiment;

FIG. 4C presents a block diagram describing the contacting of an employee by phone, when there is an answer by the employee, according to the method presented in FIG. 3A, according to one embodiment;

FIG. 6B presents a block diagram describing a method of removing or "bumping" a lower priority level employee from the selected option of the method of FIG. 5, according to one embodiment;

It will be noted that throughout the appended drawings, like features are identified by like reference numerals.

DETAILED DESCRIPTION OF TECHNOLOGY

Figure 2A:
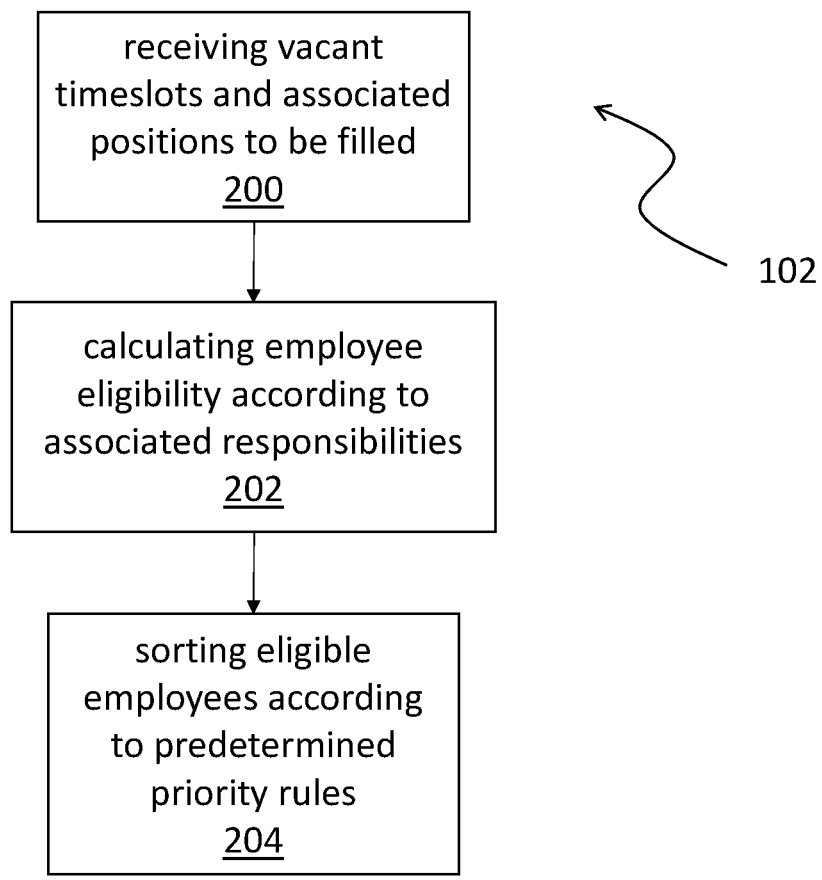
FIG. 2A presents a block diagram describing a method for determining a sorted list of eligible employees according to the method presented in FIG. 1, according to one embodiment.

Presented in FIG. 1, there is an automated resource management method 100. The automated resource management method 100 is adapted to fulfill a vacancy according to various criteria associated to employees and to predetermined rules. For instance, in the case of managing a ski hill, proper resource and employee management is required to run a successful business. A ski hill employer may be faced with the situation illustrated by table 210 of FIG. 2B. As shown, ten (10) vacancies must be fulfilled to properly operate the ski hill and provide a sufficient level of service to the skiers or customers. The employer must however follow specific rules and adapt to the various employee contact preferences, tasks/responsibilities preferences and timeslot preferences as illustrated by table 220 of FIG. 2C.

According to one embodiment as presented in FIG. 1, the automated resource management method 100 is adapted to facilitate the arduous and complex task of assigning vacant timeslots to employees having the right qualifications in an efficient and fair manner. The automated resource management method 100 comprises such steps as: i) determining a sorted list of employees according to vacancies to be filled 102, ii) contacting employees according to the sorted list and in some instances, according to the employee contact preferences 104, iii) receiving the contacted employee timeslot and position preferences 106, and iv) presenting the results based on the received employee timeslot preferences and vacant positions 108.

The step of determining a sorted list 102 takes into account multiple variables defining employee availability, such as, but not limited to: the employee's current, past and future shifts, the employee's vacation schedule, the employee's absenteeism, the employee's skills, number of hours worked by the employee, employee's availability as well as employee/worker types and the employee's contracts. The sorted list 102 allows to provide an initial list of employees that could potentially fulfill a vacant position (e.g., vacancy).

The step of contacting the employee' 104 takes into account the employee's defined contact preferences as well as priority rules defined by various business rules, such as union or seniority rules. Contacting employees 104 allows initiating simultaneous discussions with the eligible employees to fulfill a given vacant position. Once the employees are contacted 104, the system receives the employee's timeslot preferences 106. The employee's timeslot preferences are received according to the vacancy type (i.e., timeslot and position pair). In some instances, the position is a task or a responsibility. Once the employees' timeslot preferences and vacant positions are received, the vacant positions are assigned to the employees according to their preferences and the results are presented to the employees 108.

Presented in FIG. 2A, there is a method of determining a sorted list of eligible employees 102, according to one embodiment. The method 102 includes receiving vacant timeslots and associated positions to be filled 200, calculating employee eligibility according to associated responsibilities 202 and sorting employees according to predetermined priority rules 204. The vacant timeslots and associated positions to be filled are received 200 for one or multiple timeslots and also for one or multiple associated positions. According to one embodiment the timeslots can span over one or multiple days. The employee eligibility is calculated 202 for each vacant timeslot and position pair, allowing multiple combinations of available employees for each pair. The method of determining a sorted list of eligible employees 102 takes into account customized rules for each particular situation, such as a last minute fulfillment or one in the future.

For instance, as presented in FIG. 2B, there is a timeslot-position table 210 illustrating a simplified version of various positions and timeslots or shifts required to operate a small ski hill. In a day there are three (3) shifts, when in full operation there are nine (9) employees that must be appointed in every shift. Depending on the demand, some positions are however not required at given shifts. Those position-shifts are identified by an "X" in the table 210. In this table, it can be noticed that most position-shifts are fulfilled meaning that an employee has already been appointed for those position-shifts. However, there are still ten (10) position-shifts that are vacant and an employee must be found to fulfill those position-shifts.

Presented in FIG. 2C, there is an available-employee table 220 with a pool of employees that can be contacted to fulfill those ten (10) vacant position-shifts. For instance to fulfill the Receptionist 1 position during shifts "2" and "3", only Beatrice, Eric and Garry are qualified to work in that position. Moreover, only Beatrice and Eric prefer to work during "shift 2" and only Eric and Garry prefer to work during "shift 3". However, for "shift 2", Beatrice has a higher priority than Eric and for "shift 3" Garry has a higher priority than Eric. In this particular case, the determining a sorted list of eligible employees 102 of the method 100 would present Beatrice and Eric for the reception position at "shift 2" in that respective order and Garry and Eric for the reception position at "shift 3" in that respective order. Notice that the system shall also determine a sorted list of eligible employees 102 for all the other positions and shifts that are vacant according to the timeslot-position table 210 of FIG. 2B.

Figure 3A:
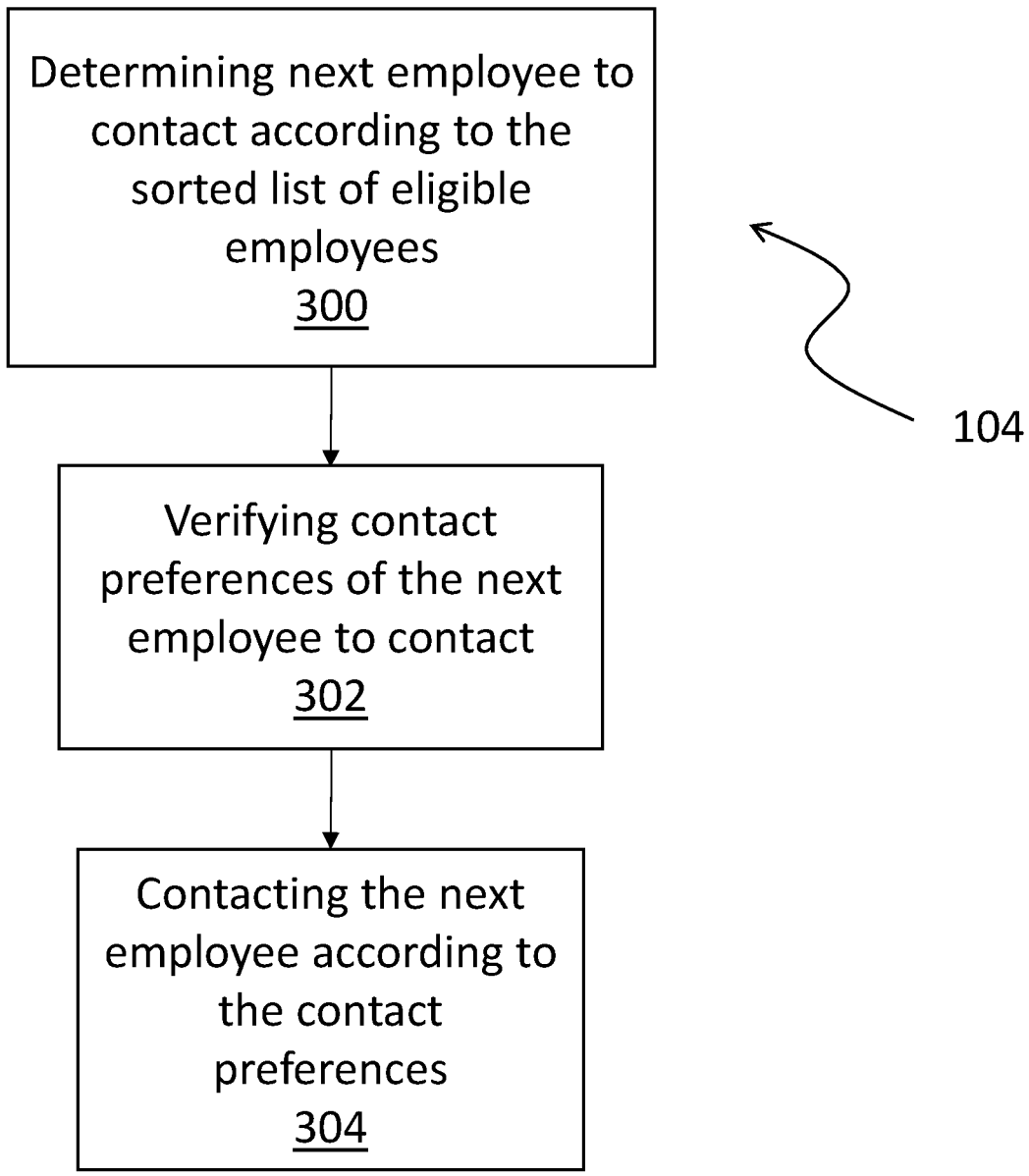
FIG. 3A presents a block diagram describing a method for contacting an employee according to the method presented in FIG. 1, according to one embodiment.

Presented in FIG. 3A, according to one embodiment, the step of contacting employees 104 further includes determining the next employee to contact according to the sorted list of eligible employees 300, verifying the contact preferences of the next employee to contact 302 and contacting the next employee according to the contact preferences 304. In some instances, the step of determining the next employee to contact is an automatic operation, preventing multiple erroneous contacts to the same employee. The contact preferences of the employee are predefined by the employee. Contact preferences include various methods or combination of methods for contacting a person such as phone calls, text messages (sms), emails, push notifications, etc. If the employee does not have any contact preferences, depending on the system, they are either not contacted or a default contacting method is used such as a phone call. There can also be an automatic operation that ensures that there are still available vacancies for a particular employee, as to avoid contacting them unnecessarily, reducing confusion and improving user experience.

For instance, if the step of contacting the employees 104 is carried out according to the vacancies illustrated in table 210 of FIG. 2B, Annie having a priority level of "1", is contacted first. If Annie accepts the Ticketing vacancy at "Shift 1", Iago that has the same qualification as Annie will not be contacted since the system atomically determines that there are no vacancies that match his preferences and qualifications anymore. If however, after successively contacting all the people having a greater priority level than Iago, the system determines that there is still a Rental vacancy remaining for "shift 3", Iago will be contacted and this position and shift will be offered to him.

Figure 3B:
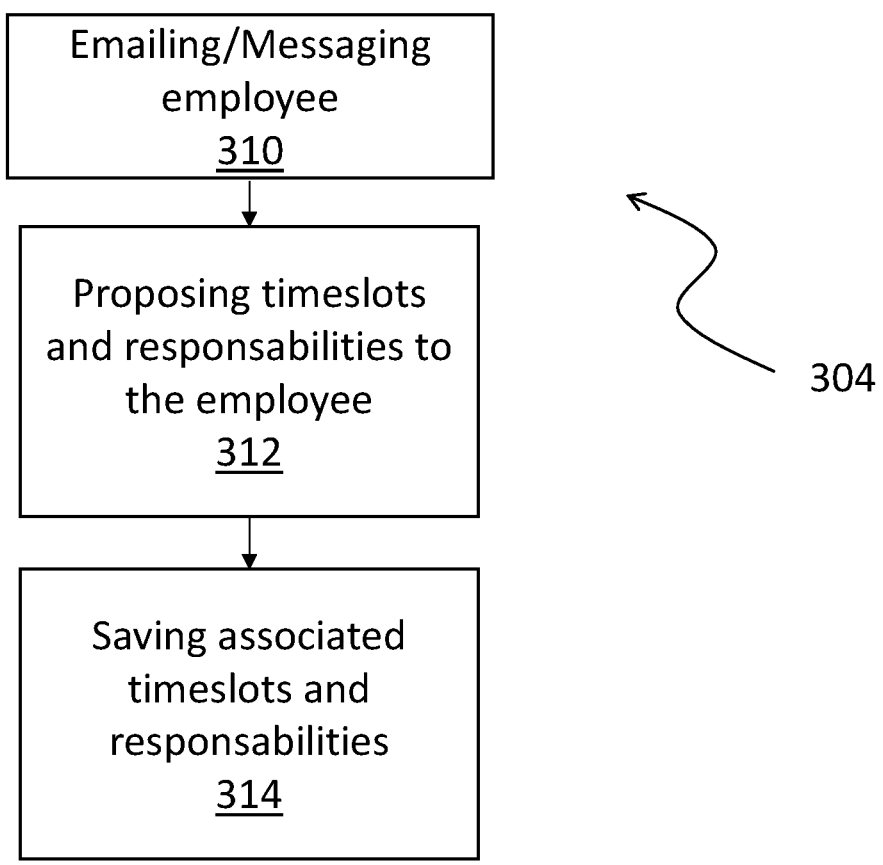
FIG. 3B presents a block diagram describing the contacting of an employee by email or messaging according to the method presented in FIG. 3A, according to one embodiment.

FIG. 3B further defines the step of contacting the employees according to their contact preferences 304. When the employee contact preference is either an email, text or push notification, the method 304 includes emailing, messaging or push notification an employee according to his/her contact preferences 310, proposing timeslots and associated responsibility (e.g., position) pairs to the employee 312 as well as saving the current state of pairs for future use 314. The email, push notification or message includes instructions informing employees how to contact the system and claim available timeslot pairs 312. This allows the system to continue contacting employees, since it can roll back to a previous scenario in order to re-assign vacancies to an employee with higher priority, in the event that an employee with lower priority accepted the vacancy before the higher priority employee enters their selection. This is commonly known as "bumping" and the lower priority employee will be recontacted to be informed of the "bumping", as well as be given a new selection of vacancies to choose from. In the event that the rules and regulations in effect demand it, it is also possible for chain bumping to occur, that is, a series of employees selecting choices that lower priority employees have selected after being bumped themselves. This is made possible by the presence of automatic transactions enabling real time confirmations of which vacancies can be selected by a particular employee.

For instance, if the step of contacting of the employees according to their contact preferences 304 is carried out according to the vacancies illustrated in table 210 of FIG. 2B, Annie having a priority level of "1" is first contacted and offered the Ticketing vacancy at "Shift 1". However, if Annie does not immediately answer or does not answer after a predetermined short period of time (example 10 minutes), the Ticketing vacancy at "Shift 1" will be offered to Iago. If Iago accepts the Ticketing vacancy, and later Annie manages to contact the system within an allowed response delay (example 1 hour), the system will offer once again to Annie the Ticketing vacancy at "Shift 1". If Annie accepts that vacancy, the vacancy will be reassigned to Annie. Iago will be "bumped" or removed from the previously assigned position and will be re-contacted by the system to inform him about the "bump" or reassignment. However, if there are still remaining vacancies that correspond to his qualifications and timeslot preferences, those vacancies will be offered to him.

In some embodiments, the system also allows chain "bumping" or chain reassignments. For instance, if following the "bumping" of Iago to let Annie have the Ticketing vacancy at "Shift 1", Iago is offered the Rental vacancy at "Shift 3". If Iago accepts the Rental vacancy at "Shift 3" within the allowed response delay and Julie had previously accepted the Rental vacancy at "Shift 3", Julie will be "bumped" if she had previously accepted that vacancy, since she has a lower priority level. Julie will then be re-contacted to be informed of the reassignment and might be offered other vacancies if still available according to her qualifications and timeslot preferences.

According to one embodiment, the allowed response delay is calculated from the time an employee with a lower priority level accepts a vacancy. For instance, if the allowed response delay is one hour and if Julie had accepted the Rental vacancy at "Shift 3" two hours before Iago finally accepts the offer, Iago will not receive a confirmation for the vacancy and Julie will be allowed to maintain Rental vacancy at "Shift 3".

It shall be understood that various vacancy attribution rules and bumping rules can be used by the method and the system without departing from the present technology.

Figure 4A:
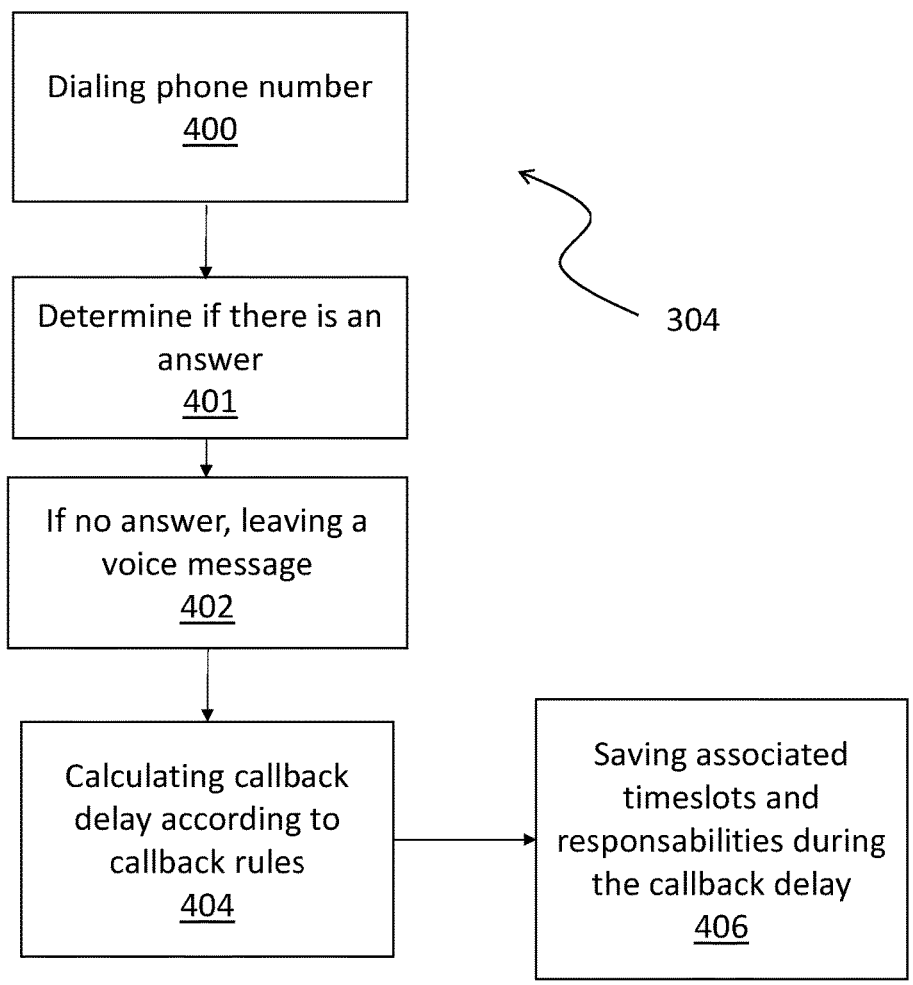
FIG. 4A presents a block diagram describing the contacting of an employee by phone, when there is no answer, according to the method presented in FIG. 3A, according to one embodiment.

Presented in FIG. 4A according to one embodiment, there is defined the step for contacting employees according to their contact preferences 304, when the contact preference is a phone call and there is no answer. The step of contacting employees 304 includes dialing the phone number 400 of the employee, determining that there is no answer 401 (e.g., the contacted employee does not answer) and leaving a voice message 402 (in the case the employee is contacted by telephone). If possible, the system attempts to leave a voice message 402 on answering machine providing instructions on how to contact back the system and claim an available timeslot and responsibility pair. After the call, the system calculates a callback delay 404 based on callback rules. The callback delay indicates how long an employee has to claim a timeslot and responsibility, even if it has been claimed previously. The callback delay may be based on a constant value and the calculation method can vary based on time of day and type of vacancies.

Following the calculation 404, the system saves associated timeslot and responsibility pairs as well as associated delays 406. It shall be recognized that different timeslot and responsibility pairs can have different delays. This delay system allows a very high number, if not infinite amount of contacts to be made simultaneously, decreasing the time required to fulfill a vacancy. This behavior is desirable in situations where vacancy fulfillment is a time sensitive operation. This multi-delay system would not be possible if not for the automatic operations powering it and preventing several employees from contacting the system at the same time, accepting the same vacancy and causing collisions.

For instance, if a vacancy fulfillment operation is carried out with the vacancies illustrated in table 210 of FIG. 2B and by contacting the employees according to the employee table 220 of FIG. 2C, it would be possible to contact Annie and Iago at the same time, in which case either Annie accepts the vacancy first and Iago is prevented from accepting it or Iago accepts the vacancy first and is "bumped" if Annie accepts it right after. In the first case, Iago would be informed that someone with higher priority has already accepted this vacancy and Iago would be offered remaining vacancies if there are any. In the second case, Iago would be called back by the system and be informed that he was bumped by someone with higher priority, and then be offered remaining vacancies if there are any.

Presented in FIG. 4B and FIG. 4C according to one embodiment, there is defined the step for contacting employees according to their contact preferences 304, when the contact preference is a phone call and the phone call is answered. The step of contacting the employees 304 includes dialing the phone number of the employee 400, obtaining an answer 408, verifying the identity of the person answering the phone call 410, proposing timeslot and responsibility pairs to the contacted employee 412 and saving associated timeslot and responsibility pairs during the callback delay 404.

The method for verifying the identity of the person answering the phone call 410 involves asking the person answering the phone call to confirm or requiring a form of authentication to continue the call, such as, but not limited to a PIN (Personal Identification Number). If the person answering the phone call is not the intended recipient or employee, the system may provide a delay to reach the employee if possible by leaving a message to the person answering the phone call. In this case, the timeslot and responsibility pairs are saved during the call back delay 404, as presented in FIG. 4B. If the identity is confirmed, the system will propose available timeslot and responsibility pairs 412 and allow the employee to claim one or multiple pairs. In this case, the claimed timeslot and responsibility pairs are saved 414 by the system, as presented in FIG. 4C.

It shall be understood that the proposed timeslot and responsibility pairs can vary from one moment to another, based on external factors such as a manager making changes to the schedule in real time; this behavior is also automatic, preventing a discrepancy between the pairs offered and the actual vacancies. For instance, in the previous example, if another user modified the Ticketing vacancy at "Shift 1" using a web based management interface during the phone call with Annie, it would no longer be offered to her and it would also prevent Annie from accepting it, had the offer already been made or prevent a confirmation of the vacancy assignment. Also, the instant Annie accepts the vacancy and an assignment confirmation is provided, the change is propagated to all external interfaces, immediately notifying any manager.

Figure 5:
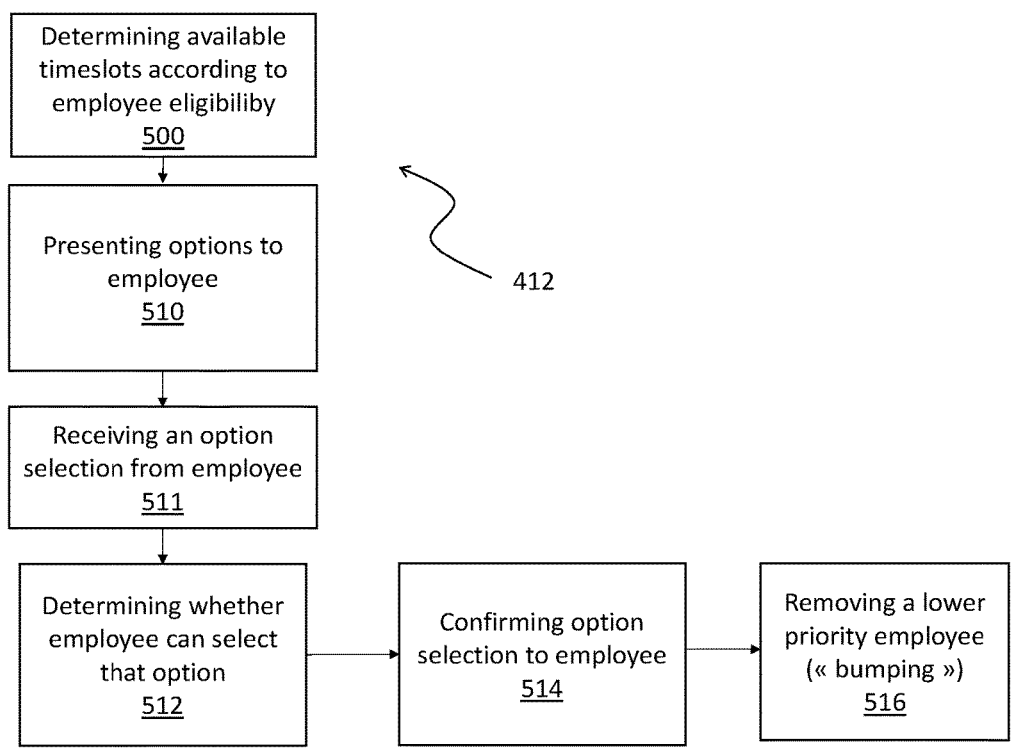
FIG. 5 presents a block diagram describing a method of proposing timeslot and responsibility pairs to the contacted employee, according to the method presented in FIGS. 4B and 4C, according to one embodiment.

Presented in FIG. 5, there is defined the step for proposing timeslot and responsibility pairs to the contacted employee 412, according to one embodiment. The step for proposing timeslot and responsibility pairs 412 includes determining available timeslots according to the employee eligibility 500, presenting options to the employee 510, receiving an option selection 511 from the employee, determining whether the employee can select that option 512 and confirming the option selection to the employee 514. Available timeslots can change in real time; therefore it is important to determine available timeslots 500 at multiple time points during the call or following a delay. Once the options are presented to the employee, the employee may choose an option, following the desired option selected by the employee; the system will determine whether or not the selected option is still available since the last determination 512. If it is still available, the employee will receive a confirmation that he has been assigned the selected option 514. This process is a real time automatic procedure, ensuring that all workforce rules and regulations are enforced. In some embodiments, this procedure is enforced using a single source of truth (SSOT) architecture in an ACID (Atomicity, Consistency, Isolation, Durability) compliant database, ensuring that all operations are successful in order to provide a confirmation to the employee. A single transaction is created to validate the availability of a particular vacancy (timeslot and responsibility pair) and assign particular vacancy to the employee if still available. This procedure allows real time confirmation that the selection process has succeeded, reducing the need to re-contact the employee and preventing any collision, confusion or double bookings of a particular vacancy.

Figure 6A:
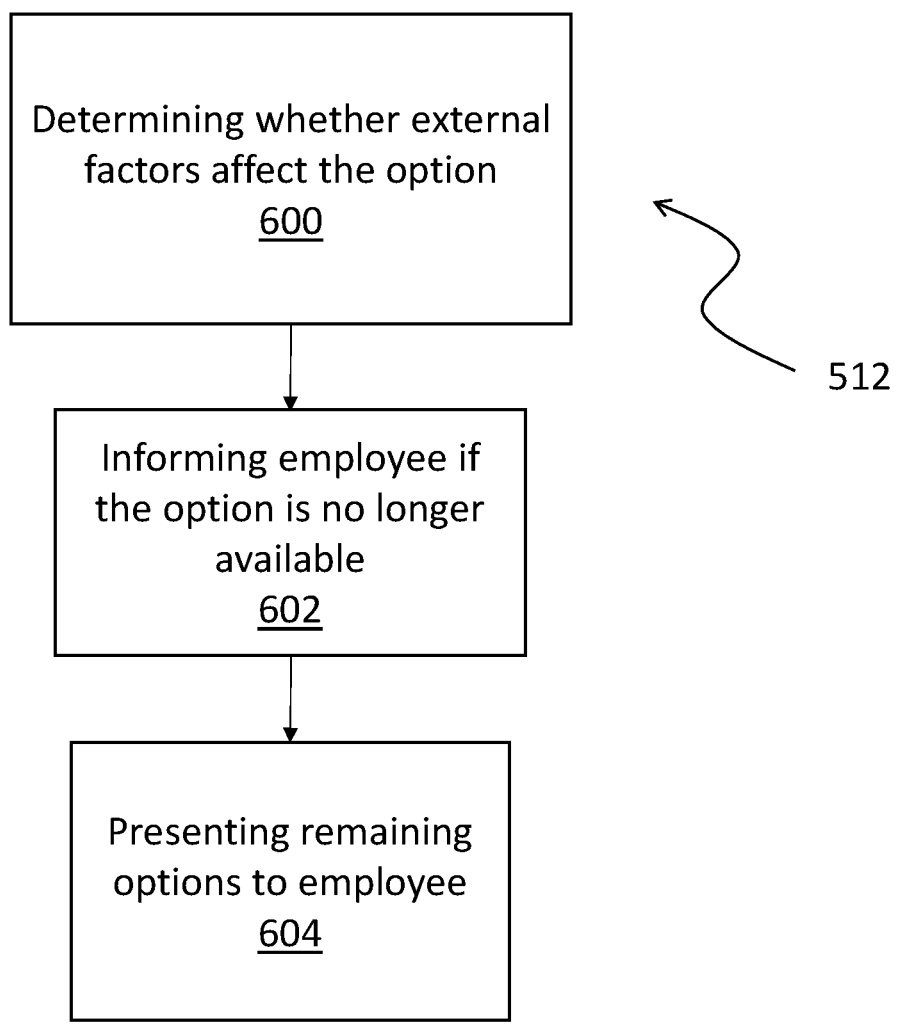
FIG. 6A presents a block diagram describing a method of determining if an employee can select an option according to the method presented in FIG. 5, according to one embodiment.

Presented in FIG. 6A, there is defined the step for determining whether the employee can select a desired option 512. The step for determining if a desired option can be selected 512 includes determining if there are external factors that can affect the proposed available timeslot and responsibility pairs 600. Then informing the employee if one or more pairs are no longer available 602 and then presenting remaining available pairs to the employee 604 if available, or otherwise informing the employee that there are no more possible pairs to select. For instance, external factors that can affect the proposed available pairs can include, but are not limited to, a change in the scheduling system by a manager, a quasi-simultaneous selection produced by another employee having a higher priority, as well as a simultaneous selection of similar vacancies by multiple employees. For instance, in table 210 of FIG. 1B, there are two (2) Lift attendant "Shift 1" vacancies. If three (3) or more employees accept the vacancy simultaneously or within a short period of time (e.g., example 10 seconds or less), only the two (2) highest priority employee will be notified that they accepted the vacancy or will receive a confirmation. The others will then be notified that the vacancy is no longer available and will be offered all remaining vacancies, if applicable.

The step for determining if the employee can select a desired option 512 requires automatic operations in the system in order to prevent duplicate selections by employees. The confirmation step enables the system to lock the selected pair if it is still available and confirm to the intended employee that he/she has successfully selected the desired option. A calculation is performed each time a pair is selected, assuring the atomicity of each operation.

Presented in FIG. 6B, there is a method for determining whether an employee with a lower priority had previously accepted the timeslot and responsibility pair. When the higher ranking employee accepts a timeslot pair before the end of their previously specified delay, they will bump a lower ranked employee. The step 612 removes this employee from the timeslot pair and contacts them to inform them that this pair is no longer available. For example, if the system contact Annie first, but she did not answer, the system would leave her a message based on her preferred method of contact. After contacting Annie, the system would eventually reach Lago, who would accept one of the vacancies that would have been offered to Annie, but were still available since she did not answer. The system would allow Lago to accept any of the vacancies. If Annie did not call back or did not call back within the required delay, Lago would retain his priority on the timeslot pair. However, if Annie did call back within her required delay, she would be able to bump Lago, removing him from the vacancy and claiming it as her own. Lago would then be called back; the system would inform him that his timeslot pair has been claimed by a higher priority employee.

Figure 6C:
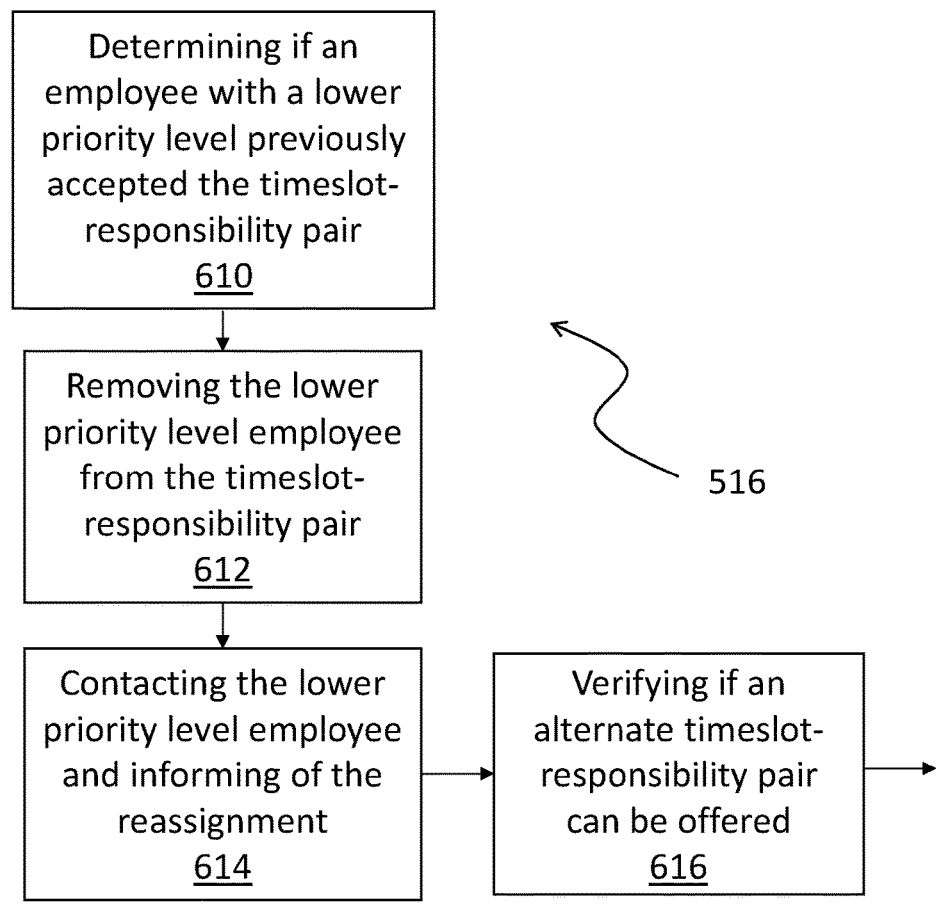
FIG. 6C presents a block diagram describing a method of removing or "bumping" a lower priority level employee from the selected option of the method of FIG. 5 and offering an alternate option, according to one embodiment.
Figure 7:
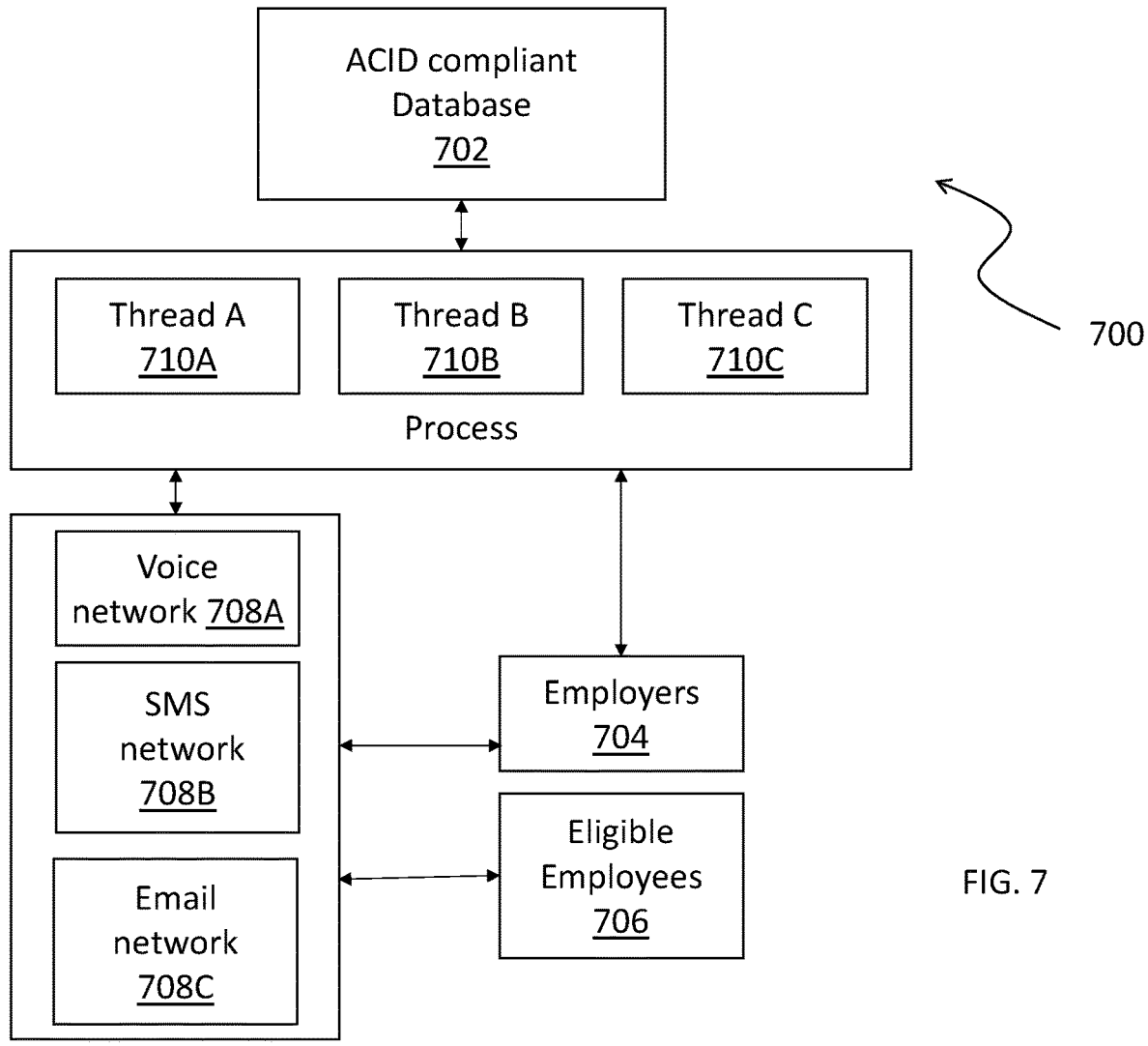
FIG. 7 presents an automated resource management system, according to one embodiment.

Presented in FIG. 6C, there is a method for proposing new vacant timeslot-responsibility pairs to an employee that has been bumped. The system will re-rank the employee, allowing them to either only select vacant timeslot pairs, or select timeslot pairs claimed by lower priority employees, based on business rules in place allowing chain bumping or not. Chain bumping herein refers to a series of bumps taking placed one after the other, all caused by a single original bump. In particular, chain bumping of employees herein refers to a series of bumps of employees taking placed one after the other, all caused by a single original bump of an employee. To follow up on the previous example, depending on whether or not there were still any pairs available, the system would propose remaining vacancies to Lago. If the business rules in place permit it, Lago would then be able to bump another lower priority employee, causing a chain of bumping. The bumped employee would then have vacancies proposed to him/her, continuing the chain until an employee can bump no one or decides to refuse remaining vacancies.

According to another aspect there is an automated resource management system for 700 having an ACID (Atomicity, Consistency, Isolation, Durability) database module 702. According to one embodiment, the database module 702 has a timeslot-responsibility pair table such as the shift-position table 210 of FIG. 2B and an employee information table such as the employee pool table 220 of FIG. 2C. As can be noticed from the shift-position table 210, various timeslot and responsibility pairs are vacant and a scheduling manager or employer 704 must find employees 706 from the employee pool table 220 to fulfill those vacancies. Notice that the employees have contact preferences 222, various qualifications 224, timeslot preferences 226 and a priority level 228. To fulfill all the vacancies of the shift-position table 210, numerous employees from the employee-pool table 220 must be contacted according to the information provided in that table 220. The eligible employees 706 can be simultaneously or sequentially contacted via various networks such as a voice network 708A, an SMS network 708B, an email network 708C or any other suitable communication network.

For Instance, in order for a vacancy to be offered to Annie, it would have to be a Ticketing or Rental vacancy during either "Shift 1" or "Shift 2", as indicated by her qualifications and timeslot preferences in the shift-position table 210 of FIG. 2B. Annie would be among the first contacted, by phone, as indicated by her contact preferences and priority level. She would be offered the Ticketing 2 at "Shift 1", since there are no vacancies for Rental 1, Rental 2 or Ticketing 1 at her preferred timeslots of "Shift 1" and "Shift 2". Other examples of eligibility requirements or combination of requirements include, but are not limited to: Assigned teams, qualification levels, contracts, permits, number of hours worked, vacations or attendance history.

According to one embodiment, the database 702 is adapted to hold data such as tables 210 and 220 associated to various threads 710A, 710B and 710C. Each runs simultaneously to respond to various concurrent requests, such as schedule changes, availability changes and interactions with communication channels. The ACID database as well as the architecture prevents multiple requests from attempting to change the same resource at the same time.

For instance, in all the previous examples, accuracy of results and data is maintained even if Annie accepted a vacancy on Thread 1, while Lago accepted the same vacancy on Thread 2 simultaneously. Annie will be notified that she accepted the vacancy or receive confirmation of the vacancy assignment to her and Lago will be prompted to select another vacancy, if possible.

It shall be recognized that although most of the examples relate to calls made over the phone, any contact method specified can be adapted to any other communication method, including, but not limited to: SMS messaging, MMS messaging, Email, Instant messaging as well as any voice or text based communication system.

It shall be recognized that although the present embodiments are related to people management, the method 100 and the system 700 are also adapted to any other kind of resource management such as equipment management, reservation management, room management, appointment management as well as any management of resources that have a defined eligibility criteria and allocation constraints.

INCORPORATION BY REFERENCE

All references cited in this specification, and their references, are incorporated by reference herein in their entirety where appropriate for teachings of additional or alternative details, features, and/or technical background.

EQUIVALENTS

While the disclosure has been particularly shown and described with reference to particular embodiments, it will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following embodiments.

The invention claimed is:

1. A method for managing resources, the method comprising:
   a) receiving user input indicating a position to be filled and a timeslot associated with the position, wherein the position has at least one eligibility criterion, and wherein the position comprises a task;
   b) determining a set of eligible persons from a set of potentially eligible persons based on the at least one eligibility criterion, each of the potentially eligible persons having associated eligibility parameters;
   c) ranking, based on determined ranking parameters and based on corresponding employee data stored in a database, the set of eligible persons from a highest ranking to a lowest ranking, wherein the database comprises an ACID (Atomicity, Consistency, Isolation, Durability) database that prevents multiple requests from changing a same resource at a same time, wherein the database comprises a first table and a second table, wherein the first table indicates timeslots and employees assigned to the timeslots, and wherein the second table comprises the employee data;

d) retrieving, from the second table of the database, contact preferences corresponding to each person of the set of eligible persons;

e) contacting each person of the set of eligible persons based on their respective contact preferences;

f) receiving, from a first person in the set of eligible persons, a first indication of an acceptance of the position;

g) assigning the position to the first person, wherein assigning the position to the first person comprises performing a first transaction on the first table of the database to assign the position to the first person and receiving, from the database, a confirmation that the first transaction was successful;

h) after receiving the indication from the first person, receiving, from a second person in the set of eligible persons, a second indication of an acceptance of the position, wherein the second person is ranked higher than the first person;

i) determining that the second indication was received within a pre-determined amount of time after contacting the second person;

j) reassigning the position to the second person, wherein reassigning the position to the second person comprises performing a second transaction on the first table of the database to reassign the position to the second person and receiving, from the database, a confirmation that the second transaction was successful; and k) notifying the first person that they have been removed from the position.

2. The method according to claim 1, wherein the first indication further includes an indication of timeslot preferences.

3. The method according to claim 1, wherein the method is performed for at least two position selections.

4. The method according to claim 1, wherein the method is performed for at least three position selections.

5. The method according to claim 1, wherein the at least one eligibility criterion include one or more of: the person's past shifts, the person's current shifts, the person's future shifts, the person's vacation schedule, the person's absenteeism, number of hours worked by the person, the person's skills, and the person's worker type.

6. The method according to claim 1, wherein the step of contacting the persons from the set of eligible persons further comprises simultaneously contacting the persons from the set of eligible persons.

7. The method according to claim 1, wherein the step of contacting the persons from the set of eligible persons further comprises sequentially contacting the persons from the set of eligible persons.

8. The method according to claim 7, wherein the sequential contacting comprises contacting a person with a highest ranking followed by contacting a person with a lowest ranking.

9. The method according to claim 7, wherein notifying the first person that they have been removed from the position comprises notifying the first person of a bumping in favor of the second person.

10. The method according to claim 9, wherein notifying the first person that they have been removed from the position comprises offering the first person a different position.

11. The method according to claim 1, further comprising verifying an identity of the first person.

12. A system for automated resource management, the system comprising: a computer system having a processor arranged to execute a method, the method comprising:

a) receiving user input indicating a position to be filled and a timeslot associated with the position, wherein the position has at least one eligibility criterion, wherein the position comprises a task;

b) determining a set of eligible persons from a set of potentially eligible persons based on the at least one eligibility criterion, each of the potentially eligible person having associated eligibility parameters;

c) ranking, based on determined ranking parameters and based on corresponding employee data stored in a database, the set of eligible persons from a highest ranking to a lowest ranking wherein the database comprises an ACID (Atomicity, Consistency, Isolation, Durability) database that prevents multiple requests from changing a same resource at a same time, wherein the database comprises a first table and a second table, wherein the first table indicates timeslots and employees assigned to the timeslots, and wherein the second table comprises the employee data;

d) retrieving, from the second table of the database, contact preferences corresponding to each person of the set of eligible persons;

e) contacting each person of the set of eligible persons based on their respective contact preferences;

f) receiving, from a first person in the set of eligible persons, a first indication of acceptance of the position;

g) assigning the position to the first person, wherein assigning the position to the first person comprises performing a first transaction on the first table of the database to assign the position to the first person and receiving, from the database, a confirmation that the first transaction was successful;

h) after receiving the indication from the first person, receiving, from a second person in the set of eligible persons, a second indication of an acceptance of the position, wherein the second person is ranked higher than the first person;

i) determining that the second indication was received within a pre-determined amount of time after contacting the second person;

j) reassigning the position to the second person, wherein reassigning the position to the second person comprises performing a second transaction on the first table of the database to reassign the position to the second person and receiving, from the database, a confirmation that the second transaction was successful; and k) notifying the first person that they have been removed from the position.

* * * * *